W. O. C. FRITSCHLER.
Plumb and Level.
No. 20,943.  Patented July 20, 1858.
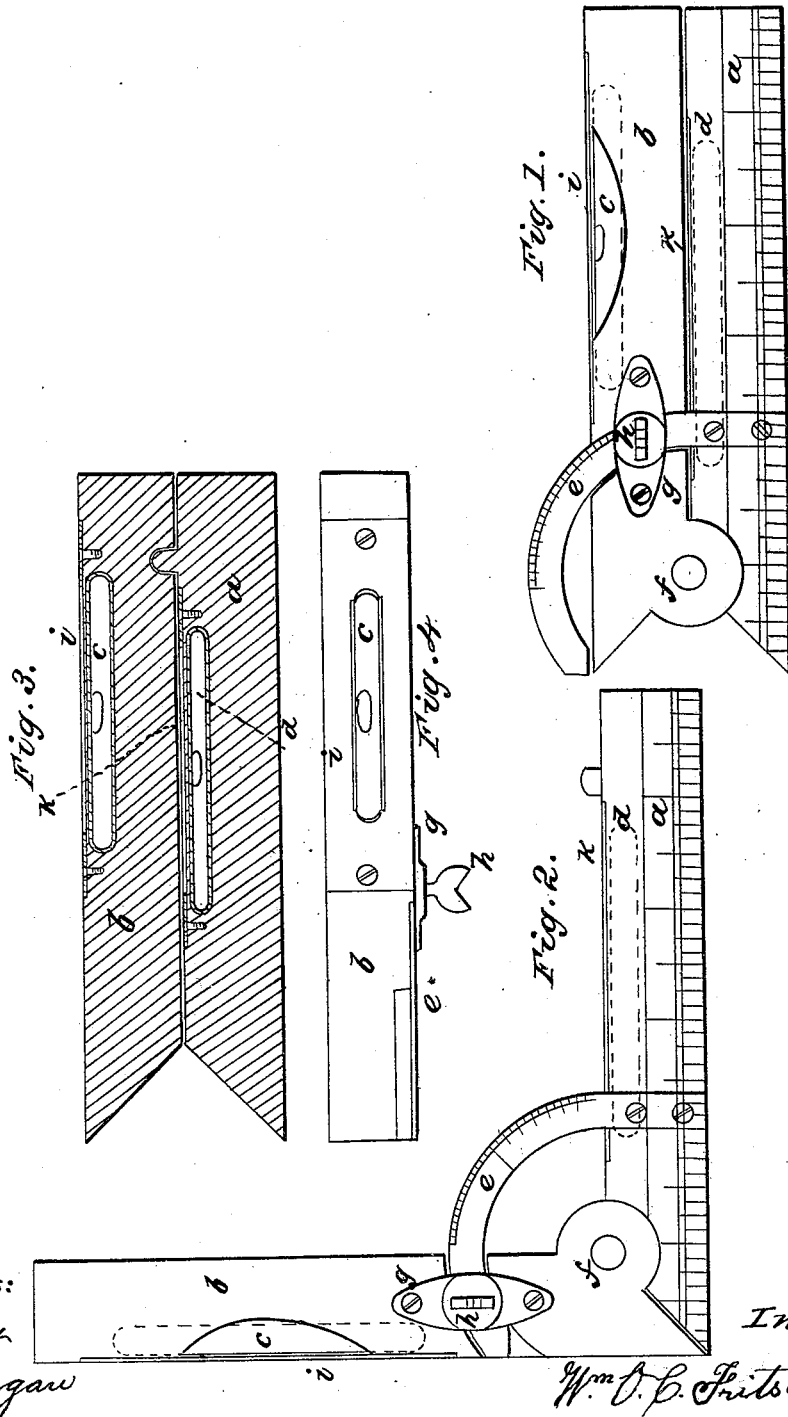

UNITED STATES PATENT OFFICE.

WM. O. C. FRITSCHLER, OF BROOKLYN, NEW YORK.

CARPENTER'S RULE.

Specification of Letters Patent No. 20,943, dated July 20, 1858.

*To all whom it may concern:*

Be it known that I, WM. O. C. FRITSCHLER, of Brooklyn, in the county of Kings and State of New York, have invented a new and Improved Instrument, which I call a "Combined Square, Plumb, Sextant, and Level;" and I do hereby declare the following to be a full, clear, and exact description of the same, reference being had to the annexed drawings, making a part of this specification, and the letters thereon.

The nature of my invention consists in the arrangement and combination of several parts of well known things into one instrument which when put together in one constitute the "combined square, plumb, sextant and level," fully capable of being used in either capacity; that is, when opened as a square it may be used as either a right or left hand plumb, the level-glasses in the stocks relatively indicating the precise relation of one to the other. Thus, if we wish to know the precise relation of a horizontal wall or floor to a vertical wall which may not be in true square, one with the other, we move the two so that one is level and the degrees on the sextant indicate at once the precise relation of one to the other. The levels on the two different arms, or stocks (*a* and *b*) indicating the precise variation between the level and the plumb by means of the degrees marked upon the sextant, including all the degrees or angles, which may be assumed, between the horizontal level and vertical plumb; the hinge acting as the fulcrum or center from which the variable arm may be made to part in its given direction from the first or starting point, whether this be the plumb or the level, up to the full angle of 90 degrees or the quarter of a circle.

The annexed drawings making a part of this specification will be found substantially explanatory, Figure 1, being a side view of the instrument when shut up, or closed, illustrating the sextant as well as the degrees of distance on horizontal line of the stock, leg, or permanent base of the lower level; the dotted lines showing the positions of the "plumb and level-glasses." Fig. 2, shows the instrument when open to its full extent, with the same relation as in Fig. 1. Fig. 3, is a longitudinal plan, through the center, showing those parts which are partly concealed in Fig. 1. Fig. 4, is a view of the top of the instrument when closed as at Fig. 1.

In all the figures like letters refer to the same parts.

To enable others skilled in the art to make and use my invention I will proceed to describe its construction and operation.

I provide a base piece which will be known as (*a*) in the drawing. To this is hinged by means of the joint or hinge (*f*), the upper arm or movable part (*b*). The two parts (*a* and *b*), when fully extended make one continuous piece; but the part (*a*) is to lie horizontally, on the level, while the piece (*b*), is prepared to assume many positions, varying from a corresponding level with the part (*a*) to a vertical position as seen at (Fig. 2). The sextant is used, not merely as a connector but as a guide and governor of the degree of elevation which is to become the subject of observation. In the examination of pieces of work, buildings, hills, hollows, etc., like remarks will apply, as the position of level will always bear like relation to the plumb in its proper position.

(*c*) in all the figures refers to the upper glass or level; (*d*) in all the figures refers to the lower glass or level.

(*b*) is the base or frame piece.

(*i*) is the protecting plate to the movable level, while (*k*) performs the same office for the permanent level-glass (*d*).

(*e*) is a part or full circular plate with the scale of degrees marked upon it, so that the precise degree of elevation may be always determined at a glance, and its comparative relations to the base or level (*a*) be at once determined.

(*g*) is a brace to sustain the relation of the base piece (*a*) with the movable piece (*b*) and the sextant (*e*), (*f*) being its controlling governor as its center or fulcrum.

(*h*) is a screw, acting with the plate or brace (*g*) to hold the pin in its proper relation to (*a*) when the whole has been set for the purpose of making an examination or taking an observation.

I will simply state that it is not new to place two levels upon one stock so as to level or plumb in different positions one in opposite direction to the other—there it could not become the subject of a patent—but I would remark that the instrument I here present has a variety of points truly novel in themselves and not shown in any of the books, nor in the patented inventions with which I have been familiar for years, always carefully watching anything which would interfere with my invention. Instance, if I wish with instrument like this to ascertain the precise elevation or pitch of a roof, or a hill, or the depth of a valley, it can be done with the aid of a telescope where distance is necessary or intervenes as well by this simple instrument as with a theodolite, simply by taking the elevation of the level-glasses as relates one to the other and applying them to the object by the eye when near by, or aid by the glass when at a distance, can ascertain the precise relations.

Believing these remarks to be sufficient to use here I will proceed to state that

What I claim as my invention and desire to secure by Letters Patent, is—

The arrangement and combination of the level (a) with the movable arm (b) furnished with a spirit level, upon the center (f) so that by means of the arc (g) and the screw (h), the glasses (c and d) may be so placed as to indicate the precise position in relation to the "plumb and level," whatever may be the variation of angle, the part (b) may necessarily assume; the said variation being indicated by the scale on the arc (e); all of which is herein fully described.

WM. O. C. FRITSCHLER.

Witnesses:
J. L. KINGSLY,
C. S. NEWELL.